United States Patent
Foag

(10) Patent No.: US 12,479,360 B2
(45) Date of Patent: Nov. 25, 2025

(54) ADAPTIVE ACOUSTIC VEHICLE WARNING SYSTEM

(71) Applicant: Bayerische Motoren Werke Aktiengesellschaft, Munich (DE)

(72) Inventor: Werner Foag, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 45 days.

(21) Appl. No.: 18/293,911

(22) PCT Filed: Aug. 8, 2022

(86) PCT No.: PCT/EP2022/072235
§ 371 (c)(1),
(2) Date: Jan. 31, 2024

(87) PCT Pub. No.: WO2023/016986
PCT Pub. Date: Feb. 16, 2023

(65) Prior Publication Data
US 2024/0336191 A1    Oct. 10, 2024

(30) Foreign Application Priority Data
Aug. 13, 2021    (DE) .................. 10 2021 121 075.5

(51) Int. Cl.
*B60Q 5/00*    (2006.01)

(52) U.S. Cl.
CPC .................. *B60Q 5/006* (2013.01)

(58) Field of Classification Search
CPC .......... B60Q 5/006; B60Q 5/008; H04R 3/00; H04R 2499/13
USPC ........................................ 340/463
See application file for complete search history.

(56) References Cited

U.S. PATENT DOCUMENTS

| | | | | |
|---|---|---|---|---|
| 5,635,903 A | * | 6/1997 | Koike | B60Q 5/008 340/384.1 |
| 8,669,858 B2 | * | 3/2014 | Yoshino | B60Q 9/00 340/384.1 |
| 10,841,698 B1 | * | 11/2020 | Janampally | G10L 25/51 |
| 11,400,859 B2 | * | 8/2022 | Soni | B60K 28/10 |
| 11,500,378 B2 | * | 11/2022 | Kentley-Klay | G08G 1/056 |

(Continued)

FOREIGN PATENT DOCUMENTS

| | | |
|---|---|---|
| DE | 100 35 673 C1 | 3/2002 |
| DE | 10 2008 012 390 B3 | 10/2009 |

(Continued)

OTHER PUBLICATIONS

International Search Report (PCT/ISA/210) issued in PCT Application No. PCT/EP2022/072235 dated Dec. 7, 2022 with English translation (5 pages).

(Continued)

*Primary Examiner* — Eric Blount
(74) *Attorney, Agent, or Firm* — Crowell & Moring LLP

(57) ABSTRACT

A pedestrian warning device for an electrically drivable motor vehicle has a warning sound generator and a warning sound controller that is configured to control the warning sound generator to make same generate, when the vehicle reverses or advances slowly, a warning sound perceptible by persons in the surroundings of the motor vehicle. The warning sound controller is configured to adapt the warning sound.

18 Claims, 1 Drawing Sheet

(56) References Cited

U.S. PATENT DOCUMENTS

| | | | |
|---|---|---|---|
| 11,733,960 B1* | 8/2023 | Karol | G08G 1/166 |
| | | | 340/463 |
| 2011/0175718 A1 | 7/2011 | Inoue | |
| 2011/0181442 A1* | 7/2011 | Nakayama | B60Q 5/008 |
| | | | 340/933 |
| 2011/0199199 A1* | 8/2011 | Perkins | B60Q 1/525 |
| | | | 340/435 |
| 2011/0241868 A1* | 10/2011 | Iwamoto | B60Q 5/008 |
| | | | 340/463 |
| 2015/0139442 A1* | 5/2015 | Kreifeldt | B60C 5/008 |
| | | | 381/86 |
| 2017/0358203 A1* | 12/2017 | MacNeille | B60Q 5/006 |
| 2018/0050635 A1* | 2/2018 | Vincent | B60W 30/09 |
| 2019/0066649 A1 | 2/2019 | Valeri et al. | |
| 2020/0238902 A1* | 7/2020 | Pyzik | B60Q 5/008 |
| 2021/0031685 A1* | 2/2021 | Xu | B60Q 5/008 |
| 2021/0114514 A1* | 4/2021 | Karol | G06N 20/00 |

FOREIGN PATENT DOCUMENTS

| | | |
|---|---|---|
| DE | 10 2009 058 903 A1 | 7/2010 |
| DE | 10 2010 048 463 A1 | 5/2011 |
| DE | 10 2011 011 722 A1 | 1/2012 |
| DE | 10 2015 223 517 A1 | 6/2017 |
| DE | 10 2015 223 523 A1 | 6/2017 |
| DE | 10 2017 207 175 A1 | 10/2018 |
| DE | 10 2018 121 025 A1 | 2/2019 |
| DE | 10 2018 202 394 A1 | 8/2019 |
| DE | 10 2018 222 003 A1 | 6/2020 |
| WO | WO 2018/197600 A1 | 11/2018 |

OTHER PUBLICATIONS

German-language Written Opinion (PCT/ISA/237) issued in PCT Application No. PCT/EP2022/072235 dated Dec. 7, 2022 with English translation (10 pages).

German Search Report issued in German Application No. 10 2021 121 075.5 dated May 30, 2022 with partial English translation (12 pages).

Korean-language Office Action issued in Korean Application No. 10-2023-7043016 dated Apr. 18, 2025 with English translation (10 pages).

* cited by examiner

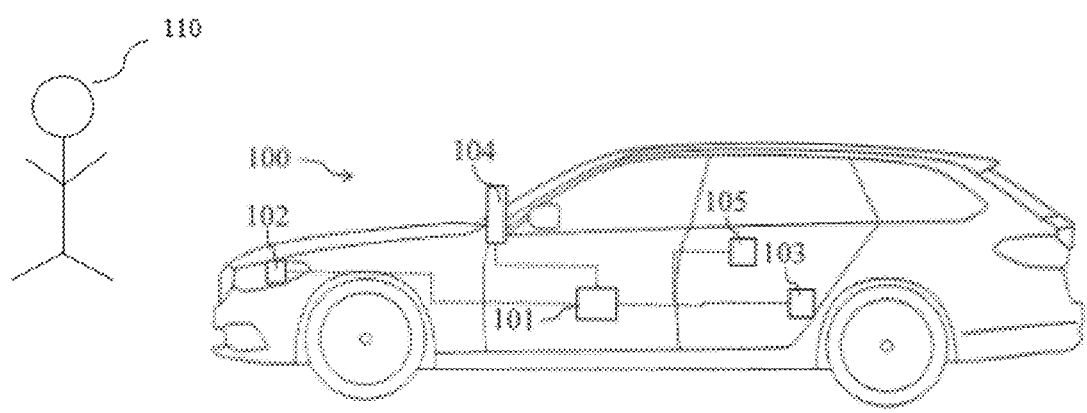

ADAPTIVE ACOUSTIC VEHICLE WARNING SYSTEM

BACKGROUND AND SUMMARY

The invention relates to a pedestrian warning device for an electrically propelled motor vehicle as well as a method for operating a pedestrian warning device for an electrically propelled motor vehicle.

Since this has been required by law, purely electric cars such as BEVs, PHEVs and FCEVs have an acoustic warning device that cannot be switched off, which is intended to warn other road users, especially pedestrians and cyclists, of the approaching vehicle at low speeds.

The conditions for a warning in the European Union are laid down in Regulation (EU) No 540/2014 of the European Parliament and of the Council of 16 Apr. 2014 on the noise level of motor vehicles ( . . . ), in particular in Article 2 in conjunction with Annex VIII 'Requirements for the Acoustic Vehicle Alerting System (AVAS). The rules formulated there for the warning sounds allow different forms of the warning sound, in terms of volume as well as in terms of the frequency components used. The warning works more or less well for the different vehicles—depending on the tonal characteristics of the underlying warning sound.

If the ambient noise from other road users or, for example, from nearby construction sites exceeds a certain level, a legally compliant acoustical warning xEV (BEV, PHEV, FCEV) may theoretically not be heard.

Against this background, it is an object of the invention to improve the warning of persons in the vicinity of low-speed electrically propelled vehicles.

Each of the independent claims, with its characteristics, defines a subject-matter that achieves this object. The dependent claims relate to advantageous developments of the invention.

BRIEF DESCRIPTION OF THE DRAWING

The FIGURE schematically depicts a motor vehicle having an exemplary pedestrian warning device according to the invention.

DETAILED DESCRIPTION OF THE DRAWING

Referring to the FIGURE, a pedestrian warning device is disclosed for a temporarily or exclusively purely electrically propelled motor vehicle 100, in particular for a BEV (battery electric vehicle), PHEV (plug-in hybrid electric vehicle) or FCEV (fuel cell electric vehicle).

The pedestrian warning device has a warning sound generator 104, which can be in the form of a loudspeaker, for example. In addition, the pedestrian warning device has a warning sound controller 101, which may be in the form, for example, of a software component of a drive control unit or other control unit typically installed in a modern motor vehicle, and which is set up to control the warning sound generator 104 in order to generate a warning sound perceptible to persons in the vicinity of the motor vehicle when reversing and/or driving slowly forwards, in particular as long as at least one warning condition is met.

In particular, the warning conditions to be applied, if appropriate, are prescribed by law and/or standards, for example in the EU by Regulation (EU) No 540/2014 of the European Parliament and of the Council of 16 Apr. 2014 on noise from motor vehicles ( . . . ), in particular in Article 2 in conjunction with Annex VIII "Requirements for the Acoustic Vehicle Alerting System (AVAS)". Many other countries either have their own similar legislation or have at least followed the sense of the EU regulations or their US, Chinese or Japanese counterparts.

The pedestrian warning device is set up to determine the ambient noise background of the motor vehicle and to define, in particular to adapt, the warning sound depending on the ambient noise background, wherein in particular "adapt the warning sound" means that an adaptation of at least one characteristic of the at least one warning sound parameter—for example, based on a standard warning sound—and in particular "depending on the ambient noise" means that the definition/adaptation of the warning sound is carried out in relation to at least one characteristic of an ambient noise parameter of the ambient noise background.

This makes it possible to ensure that even in the event of a loud and/or shrill ambient noise background, the warning sound can be reliably perceived by the persons in the vicinity of the motor vehicle.

According to a further aspect, a method is disclosed for operating a pedestrian warning device in an electrically propelled motor vehicle, having at least the following procedural steps:

(A) determining an ambient noise background of the motor vehicle;
(B) defining, in particular adapting, a warning sound depending on the ambient noise level determined;
(C) emitting the defined, in particular adapted, warning sound.

The invention is based, inter alia, on the consideration that if the ambient noise from other road users or, for example, from nearby construction sites exceeds a certain level, it is also much easier to fail to hear an xEV (BEV, PHEV, FCEV) that warns acoustically in accordance with the law than it is to hear a combustion engine.

This is because the xEV warning sound has a largely constant volume, whereas any combustion engine produces sound radiation with rhythmic alternation of relatively loud and relatively quiet moments. The loud moments of the combustion engine are (in some cases considerably) louder than the typical (legally compliant) constant level of the xEV warning sound, which makes them easier to perceive.

Furthermore, in many vehicles, the (legally compliant) warning sound is relatively low in harmonics and therefore less aggressive than the combustion engine noise and therefore easier to ignore under certain circumstances. In an acoustically quiet environment, this is usually not the case and therefore not a problem.

The invention is based, among other things, on the idea, depending on the loudness and/or frequency distribution of the ambient noise, of either raising the level of the xEV warning sound or/and making the sound character of the warning sound more aggressive and thus more perceptible.

For this purpose, a sensor system is required for at least a rough detection of the ambient noise, which can be used as a guide for adapting the sound synthesis for the warning sound.

According to one version, the microphones 105 for hands-free and/or voice input can also be used in a cost-saving manner with sufficient accuracy if the sound generated by the ego-vehicle (usually radio/media playback) is subtracted from the output signal, and thus the ambient noise entering the vehicle from the outside is estimated as a time average. With such an approach, the opening condition of the window(s) and sunroof can also be taken into account, and, if necessary, sound-absorbing glazing as a correction factor. However, a preferred design is nevertheless likely to remain a simple and therefore advantageous microphone 102 for outdoor use in most use cases/vehicle projects.

According to one version, it may also be possible to give the driver a manual temporary switch to the more perceptible ambient noise ("soft horn"), with which he can warn specific road users in a targeted manner in individual events without frightening them.

According to one version, the pedestrian warning device is set up to determine the ambient noise background on the basis of a characteristic of at least one ambient noise parameter, such as loudness and/or frequency distribution of the ambient noise background. This makes it clear as to what the acoustic signal is like that the warning sound generator must perceptibly drown out.

According to one version, the warning sound controller 101 is set up to determine, in particular to adapt, at least one warning sound parameter, such as a loudness and/or a frequency or frequency distribution of the warning sound depending on the ambient noise background. As a result, the warning sound can be determined/adapted in such a way that it does not remain unheard in very different noise backgrounds, nor is it inappropriately loud/shrill and thereby possibly frightening.

According to one version, the adapted warning sound, in particular in its overall frequency spectrum, or at least part thereof, is louder than an unadapted (standard) warning sound and/or has a wider frequency spectrum than an unadapted (standard) warning sound, in particular so that the adapted warning sound has more harmonic components and/or is more aggressive. As a result, warning of persons in the vicinity of the motor vehicle can still be reliably implemented.

According to one version, the pedestrian warning device may also, in particular by means of the warning sound controller 101, produce time-varying noises, in particular in terms of the loudness and/or frequency composition thereof, which at least temporarily drown out a stochastic or largely constant ambient noise and thus draw attention to the warning vehicle. In particular, the warning sound then automatically switches back and forth, especially once or several times per second, between a normal and a more conspicuous expression due to volume and/or frequency distribution, in order to draw the attention of pedestrians even better to the vehicle movement. Such a version may, in particular, be considered similar to a reversing beeper of a construction site vehicle and can represent a kind of "reversing beeper light" because the noise produced does not have the startling effect of a beep but attracts attention through the recurring temporal variation of the warning sound.

According to one development, the pedestrian warning device has an ambient noise sensor system 103 set up to determine the ambient noise background.

In this way, a real, not just a model-based ambient noise background can be determined, i.e. detected by sensors.

According to one development, the ambient noise sensor system has an external microphone 102 located outside a vehicle interior. In this way, it is possible to use advantageous hardware for high-quality acoustic detection of ambient noise.

According to one development, the ambient noise sensor system 103 has at least one internal microphone 105 located in the vehicle interior, in particular a hands-free device and/or voice input. In this way, the ambient noise sensor systems in most current vehicles do not require additional hardware, i.e. can use internal microphones that are already available.

According to one development, the warning sound controller 101 is set up to take into account an opening state of at least one window and/or sunroof and/or trunk for determining the ambient noise background and additionally sound-absorbing glazing, if appropriate, in particular as a correction factor. This means that an internal microphone can be used to determine a sufficiently realistic approximation of the ambient noise background, regardless of an operating condition in the vehicle interior.

According to one development, the warning sound controller 101 is set up to disregard the intrinsic noise of the motor vehicle, in particular to deduct it from a detected overall noise background, for determining the ambient noise background. This ensures an accurate determination of the ambient noise background.

According to one development, the warning sound controller is set up to estimate an average over time of the ambient noise that is transmitted from the outside to or into the motor vehicle for determining the ambient noise background. This ensures the determination of an ambient noise "background" in the strict sense, without too great an influence of loud and/or shrill individual noises.

According to one development, the pedestrian warning device has a trigger unit which is set up to emit the adapted warning sound in the event of and/or during operation by a vehicle driver. By means of such a "soft horn", a warning signal that can be user-activated can be perceptibly emitted for the intended recipients that does not have the frightening potential of a standard horn.

According to one development of the method, the adapted warning sound is only emitted in the event of and/or during operation by a vehicle driver.

According to an alternative development of the method, the adapted warning sound is only emitted in the event of and/or during the presence of at least one warning condition. A warning condition may be, for example, the presence or expected presence of a pedestrian 110, cyclist, motorcyclist or similar in or in the vicinity of a planned trajectory of the motor vehicle.

In order to detect an existing warning condition, a camera system that is already present in the motor vehicle can be equipped with an environment detection device, in particular with an ability to detect movement and/or obstacles and/or persons.

What is claimed is:

1. A pedestrian warning device for an electrically propelled motor vehicle, comprising:
    a warning sound generator;
    a warning sound controller configured to control the warning sound generator in order to produce a warning sound perceptible to persons in a vicinity of the motor vehicle when reversing and/or moving slowly forward; and
    an internal microphone located interior to the vehicle and configured to detect external noise,
    wherein the warning sound controller is further configured to determine an ambient noise background of the motor vehicle based on the external noise detected by the internal microphone and to adapt the warning sound depending on the ambient noise background.

2. The pedestrian warning device according to claim 1, wherein the warning sound controller is configured to determine the ambient noise background based on a characteristic of at least one ambient noise parameter.

3. The pedestrian warning device according to claim 2, wherein the ambient noise parameter is a loudness and/or frequency distribution of the ambient noise background.

4. The pedestrian warning device according to claim 1, wherein the warning sound controller is configured to adapt at least one warning sound parameter depending on the ambient noise background.

5. The pedestrian warning device according to claim 4, wherein the at least one warning sound parameter is a loudness and/or a frequency or frequency distribution of the warning sound.

6. The pedestrian warning device according to claim 4, wherein the adapted warning sound is louder and/or has a wider frequency spectrum than an non-adapted warning sound.

7. The pedestrian warning device according to claim 4, wherein the adapted warning sound, in terms of a loudness and/or frequency composition thereof, is time-variable, and automatically changes back and forth between a normal characteristic and a characteristic that is more noticeable due to the volume and/or frequency distribution.

8. The pedestrian warning device according to claim 1, further comprising:
an ambient noise sensor system configured to detect the ambient noise background.

9. The pedestrian warning device according to claim 8, wherein the ambient noise sensor system has an external microphone located outside of an interior of the vehicle.

10. The pedestrian warning device according to claim 9, wherein the ambient noise sensor system has the internal microphone located in the interior of the vehicle.

11. The pedestrian warning device according to claim 10, wherein the warning sound controller is configured to factor into account an opening state of at least one window and/or sunroof and/or trunk, as a correction factor for determining the ambient noise background.

12. The pedestrian warning device according to claim 1, wherein the warning sound controller is configured to disregard intrinsic noise of the motor vehicle in determining the ambient noise background.

13. The pedestrian warning device according to claim 12, wherein the intrinsic noise is disregarded by being subtracted from a detected overall noise background.

14. The pedestrian warning device according to claim 1, wherein the warning sound controller is configured to estimate a time average of the ambient noise penetrating from outside to, or into, the motor vehicle for determining the ambient noise background.

15. The pedestrian warning device according to claim 1, further comprising:
a trigger unit configured to emit the adapted warning sound in an event of and/or during operation by a vehicle driver.

16. A method for operating a pedestrian warning device in an electrically propelled motor vehicle, comprising:
determining an ambient noise background of the motor vehicle based on external noise detected by an internal microphone located interior to the vehicle;
adapting a warning sound depending on the determined ambient noise background; and
emitting the adapted warning sound.

17. The method according to claim 16, wherein the adapted warning sound is only emitted in an event of and/or during operation by a vehicle driver.

18. The method according to claim 16, wherein the adapted warning sound is only emitted in an event of and/or during an existence of a warning condition.

* * * * *